(12) United States Patent
McAlear

(10) Patent No.: US 9,900,326 B2
(45) Date of Patent: Feb. 20, 2018

(54) METHOD AND APPARATUS FOR PROTECTING COMPUTER FILES FROM CPU RESIDENT MALWARE

(71) Applicant: James McAlear, Nepean (CA)

(72) Inventor: James McAlear, Nepean (CA)

( * ) Notice: Subject to any disclaimer, the term of this patent is extended or adjusted under 35 U.S.C. 154(b) by 0 days.

(21) Appl. No.: 15/146,377

(22) Filed: May 4, 2016

(65) Prior Publication Data

US 2016/0344749 A1 Nov. 24, 2016

(30) Foreign Application Priority Data

May 21, 2015 (CA) .................................... 2892064

(51) Int. Cl.
| | |
|---|---|
| *H04L 29/06* | (2006.01) |
| *G06F 21/55* | (2013.01) |
| *G06F 21/60* | (2013.01) |
| *G06F 21/78* | (2013.01) |
| *G06F 21/83* | (2013.01) |

(52) U.S. Cl.
CPC .......... *H04L 63/1408* (2013.01); *G06F 21/55* (2013.01); *G06F 21/60* (2013.01); *G06F 21/78* (2013.01); *G06F 21/83* (2013.01); *H04L 63/08* (2013.01); *H04L 63/145* (2013.01)

(58) Field of Classification Search
CPC ... H04L 63/1408; H04L 63/145; H04L 63/08; G06F 21/83; G06F 21/78; G06F 21/55; G06F 21/60

USPC .......................................................... 726/22
See application file for complete search history.

(56) References Cited

U.S. PATENT DOCUMENTS

| | | | |
|---|---|---|---|
| 8,826,043 | B2 | 9/2014 | Moran et al. |
| 2004/0003262 | A1* | 1/2004 | England ................ G06F 21/606 713/189 |
| 2008/0104694 | A1 | 5/2008 | Powell et al. |
| 2008/0114956 | A1 | 5/2008 | Safa et al. |
| 2010/0186070 | A1* | 7/2010 | McAlear ................. G06F 21/85 726/5 |
| 2015/0074820 | A1 | 3/2015 | Toda et al. |

\* cited by examiner

*Primary Examiner* — John B King
(74) *Attorney, Agent, or Firm* — Dicke, Billig & Czaja, PLLC

(57) ABSTRACT

Apparatus for use with a computer to secure the computer's stored data against malware in the computer's central processing unit (CPU). The apparatus comprises a keyboard and display. The keyboard is connected to the computer's central bus, and a secure connection to the computer's data storage device. The secure connection is operable independent of the CPU. The storage device comprises a file system to manage the stored data independent of the CPU. The keyboard is configured for displaying, on the display, the stored data independent of the CPU. The keyboard, storage device and secure connection operate to protect data and prevent the CPU from accessing the protected data. The computer may be networked and configured to authenticate the computer's user and securely communicate data between another network computer and the keyboard and/or monitor of the computer independent of the computer's CPU.

16 Claims, 6 Drawing Sheets

METHOD AND APPARATUS FOR PROTECTING COMPUTER FILES FROM CPU RESIDENT MALWARE

CROSS-REFERENCE TO RELATED APPLICATIONS

This application claims priority to Canadian Patent Application No. 2,892,064, filed May 21, 2015.

FIELD OF THE INVENTION

The invention relates generally to computer security and, more particularly, to a method and apparatus for preventing malware running on a computer's central processing unit (CPU) from accessing and modifying stored data.

BACKGROUND

Computer malware (a shorthand term referring to "malicious software"), generally refers to computer software which enters a computer, typically without the knowledge or intention of a computer user, and when executed by the computer's central processing unit (CPU), causes damage to or disables, or otherwise compromises or interferes with the normal operation of that computer and/or the computer files and systems associated with it. Computer attacks by malware present an on-going and growing risk to computer systems and computer users. For example, in 2013, malware known as "CryptoLocker", a type of malware known as ransomware, suddenly and rapidly spread across a range of international and domestic networks, and effectively destroyed the files in memory disks/drives of a large number of infiltrated computers by encrypting those files so they could not be opened without co-operation from the malware perpetrator who then sent a ransom message to the computer user demanding payment for the decryption key for the now inaccessible computer files. Other types of attacks include malware theft of confidential information in respect of which the objective of the perpetrator may be to gain valuable intellectual property or publish such private information to cause great embarrassment to the victim.

Therefore, it is desirable to design computers, and computer systems, in such a manner that they can avoid such damage or compromise if and when attacked by malware.

SUMMARY OF THE INVENTION

In accordance with the invention, an apparatus is provided for securing data of a data storage component connected to a computer's central bus against malware resident in central processing unit of the computer. The apparatus is for use with a host computer having a central processing unit operated by an operating system and a central bus connecting the central processing unit to computer system components including peripheral components. A keyboard includes or is connectable to a display, wherein the keyboard is configured for connection to the central bus. A secure connection is provided for communicating data between the data storage component and the keyboard wherein the secure connection is operable independently of the central processing unit. A file system is configured to manage data of the data storage component independently of the central processing unit. The keyboard is configured for displaying on the display data communicated from the data storage component independently of the central processing unit. The keyboard, data storage component and secure connection are together operable to enable a user to set or assert data of the data storage component for protection and to prevent the central processing unit from accessing the set or asserted data by requiring the user to confirm any access to the set or asserted data by the central processing unit.

For example, the data storage component may be a disk drive comprising the file system, with the file system comprising file system software in fixed memory and a micro-controller configured to execute the file system software. Alternatively, for example, the keyboard and the file system may be provided by a keyboard unit connectable, as a peripheral component, to the host computer and the central bus, the data storage component being an external memory device connectable to a keyboard unit, and the file system comprising file system software in fixed memory and a micro-controller configured to execute the file system software.

The apparatus may also include a monitor connectable to the central bus and comprising display drivers operative for rendering directly on the monitor, independently of the central processing unit, data files of the data storage component, wherein the keyboard, data storage device and secure connection are together operable to enable a user to select the set or asserted data for display on the monitor independently of the central processing unit, and to display the set or asserted data on the monitor independently of the central processing unit by requiring the user to confirm a transfer of the set or asserted data to the monitor for display.

The secure connection may, for example, be provided by an independent connection between the keyboard and the data storage component that is physically separate from the central bus; or, as a control line of the central bus which is operative in a secure mode to control switches for disabling the central bus from communicating data from the data storage component and/or the keyboard to the central processing unit.

The apparatus may include a network interface card (NIC) connectable to the central bus for network communications between the host computer and a remote computer configured for secure transfer of data to a user of the host computer independent of the host computer's central processing unit, wherein the network interface card includes a reserved protocol port for communicating data with the secure connection, the remote computer comprising a remote central processing unit, a remote data storage device connected to the remote central processing unit by a remote central bus, a remote network interface card (NIC) connected to the remote central processing unit and configured to obtain and authenticate credentials information from a user of the host computer, a credentials memory unit connected to the remote NIC for storing user credential information used by the NIC to authenticate users of the host computer for communicating with the remote computer, and a remote secure connection for communicating data between the remote storage device and a reserved protocol port of the remote NIC. The remote data storage device, remote NIC and remote secure connection together are operative to enable an authenticated user of the remote computer to request data of the remote storage device and to transfer the requested data from the remote storage device via the remote secure connection to the reserved protocol port of the host computer's NIC via the reserved protocol port of the remote computer's NIC.

The apparatus may also include a USB system wherein the USB system comprises a USB host controller connected to the central bus and the secure connection of the host computer, and at least one USB data storage device connected to the USB host controller, wherein the USB host controller is configured to define endpoints of the USB data storage device, the USB data storage device comprising protected data between the defined endpoints, the USB host controller controlling transfer of the protected data between the defined endpoints to the secure connection of the host computer.

In accordance with a further aspect of the invention there is provided a method for securing data of a data storage device of a host computer against malware resident in a central processing unit of the host computer. Data is communicated via a secure connection between the data storage device and a user interface device, wherein the secure connection operates independently of the central processing unit. Data of the data storage device is managed independently of the central processing unit. Data communicated from the data storage device independently of the central processing unit is display on the user interface device. The user interface device, the data storage device and the secure connection are operated for: (i) enabling a user to set or assert data of the data storage device for protection; and, (ii) for preventing the central processing unit from accessing the set or asserted data by requiring the user to confirm via the user interface device any access to the set or asserted data by the central processing unit.

Optionally, data files of the data storage device may be rendered directly on a monitor of the host computer independently of the central processing unit, with the user interface device, data storage device and secure connection being operated for: (i) enabling a user to select the set or asserted data for display on the monitor independently of the central processing unit; and, (ii) displaying the set or asserted data on the monitor independently of the central processing unit by requiring the user to confirm a transfer of the set or asserted data to the monitor for display Further features and advantages of the invention will be apparent from the detailed description which follows together with the accompanying drawings.

BRIEF DESCRIPTION OF THE DRAWINGS

A better understanding of the invention will be obtained by considering the detailed description below, with reference to the following drawings.

DESCRIPTION OF PREFERRED EMBODIMENTS OF THE INVENTION

The invention provides a method and apparatus for use in computers and computer networks to prevent malware running on a computer's central processing unit (CPU) from accessing stored data and, thus, from attacking that data.

Figure 1:
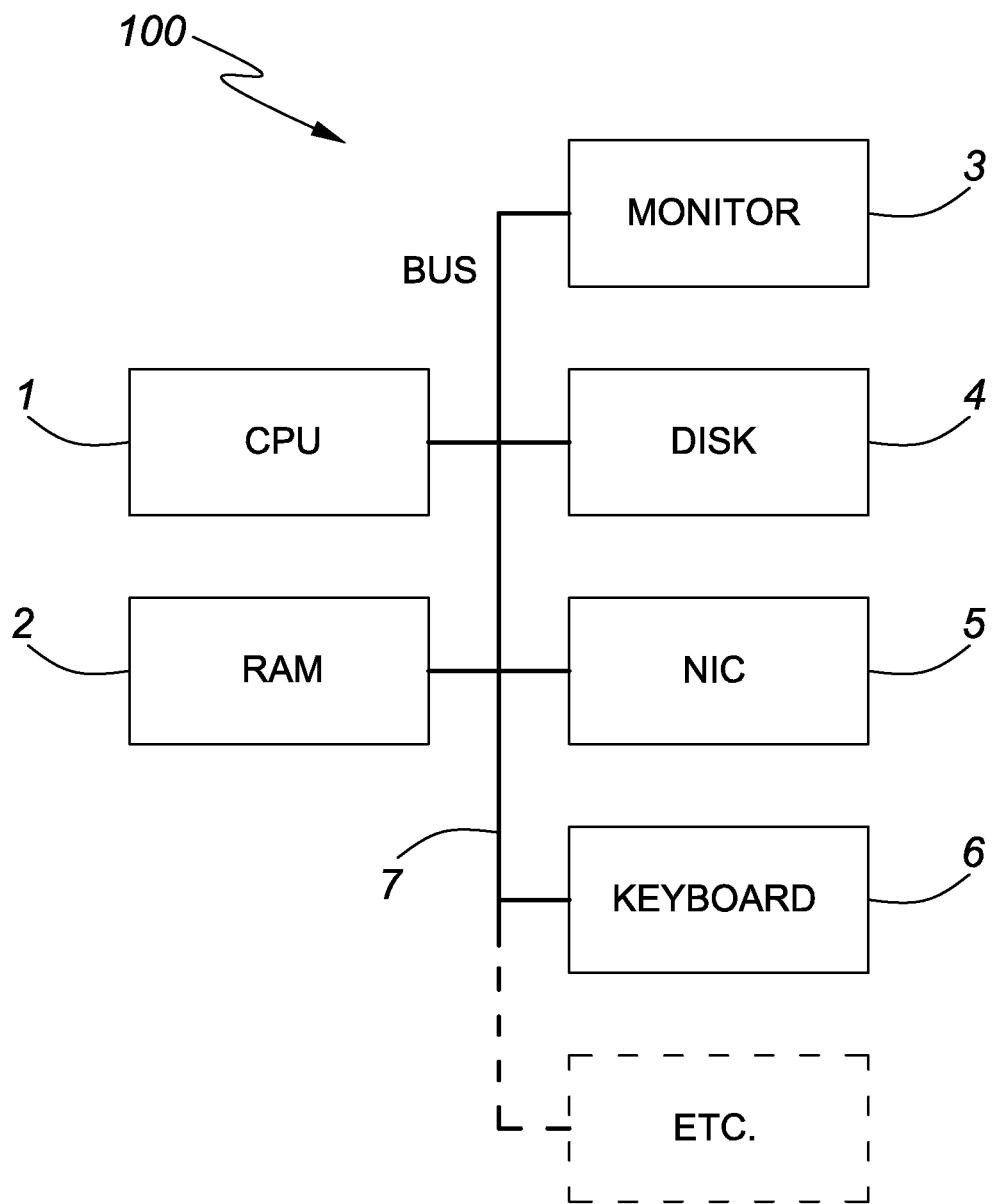
FIG. 1 is a prior art block diagram showing the basic components, and connectivity thereof, of a conventional computer.

Conventional computers are configured as shown in FIG. 1, wherein a central bus 7 communicates data between components of the computer and the CPU 1 via its operating system (OS) and using the RAM 2, executes programs and controls all of the operations of the computer. Typically a monitor 3 (also referred to as a display), one or more disks 4 (referring to any data storage medium), a network interface card (NIC) 5 and a keyboard 6 are connected to and accessed by the CPU 1 through the bus 7. The CPU 1 mediates all user actions and, thus, any malware running on the CPU 1 potentially has more control over all operations than a user of the computer does. A file system is implemented by the CPU 1 and its OS to access and control files of the RAM 2 and storage disks and media of the computer. Subject to control settings, the file system allows a user to obtain a listing of file names and metadata within a designated directory (e.g. via a Unix operating system "ls" command) and to move (e.g. via a Unix operating system "my" command), copy (e.g. via a Unix operating system "cp" command) and remove (e.g. via a Unix operating system "rm" command) files within and between directories. Control settings of the file system enables a file or directory owner (owning user) to control whether other users can read or write to a file or directory (e.g. a Unix "chmod" command).

Figure 2:
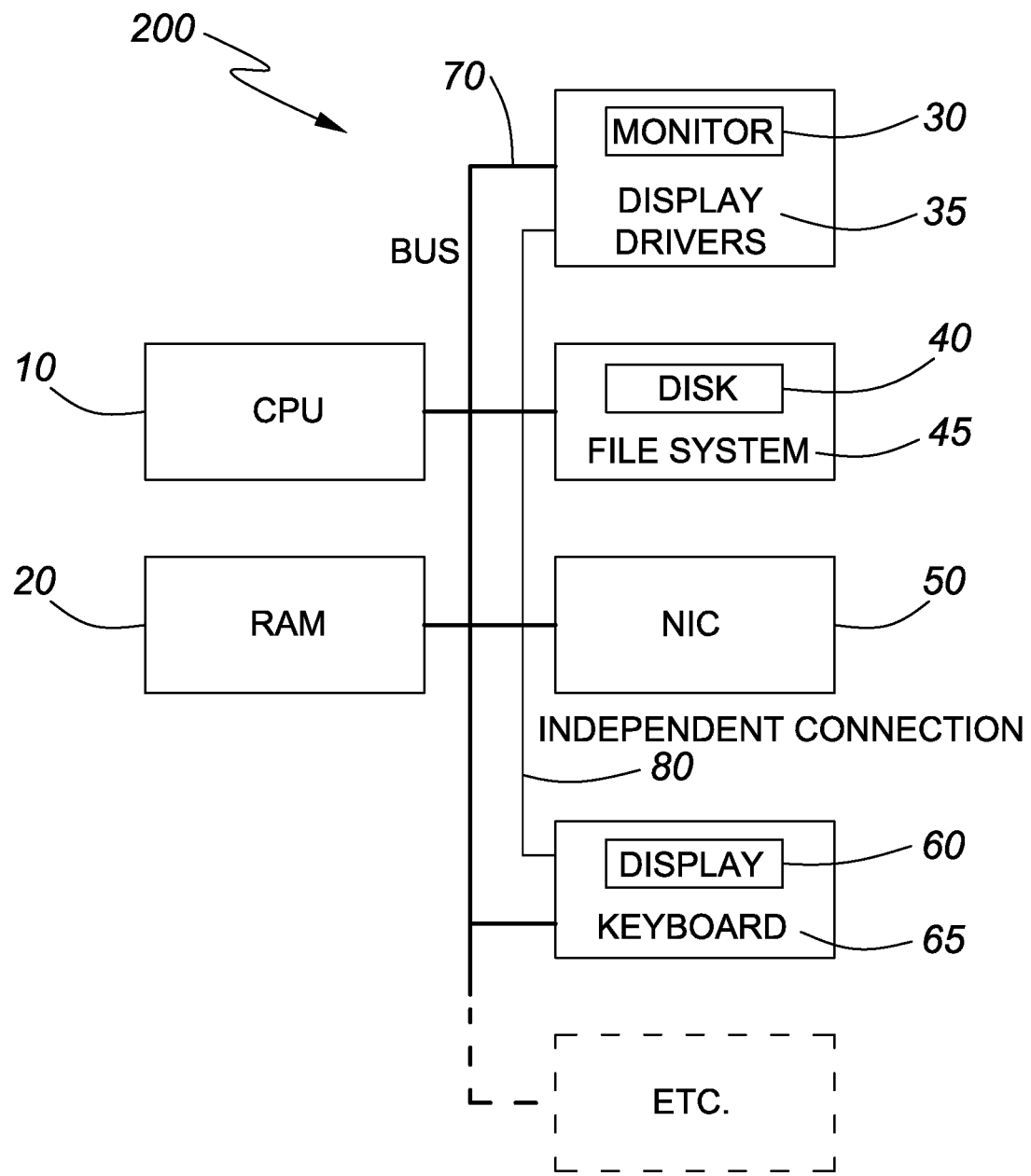
FIG. 2 is a block diagram showing components of a modified computer architecture, and connectivity thereof, in accordance with an aspect of the invention.

The present invention provides a computer architecture such as that illustrated in FIG. 2 which allows a user to set or assert selected files of a data storage device 40 for protection such that the CPU 10 cannot, for example, access and/or overwrite any such file without first obtaining direct permission of a user of the computer, and such permission is provided in a secure mode manner that cannot be bypassed by any malware on the CPU 10. This is achieved by a combination which establishes means for certain independent operations to take place in key components and provides the user with privileged oversight and control over certain functions.

Specifically, with reference to FIG. 2, a user interface device 65 in the form of a keyboard includes or is connectable to a display 60 which is independent of the CPU 10. In addition, an independent connection 80, which is independent from the bus 70 and, thus, the CPU 10, is provided for communicating data between the keyboard 65 and the data storage disk (device) 40. In addition, the data storage disk 40 includes a functionally independent file system 45 whereby the combination of disk 40 and file system 45 is configured to manage whole files independent of the CPU 10 and its operating system, including performing a gating function to control what the CPU 10 and its operating system are able to do to files. The independent operation of the file system 45 on the storage disk 40, therefore, contrasts with the above-described operation of a conventional-type file system of a computer which is operated by the computer's CPU 10 and its operating system (OS).

For the present invention, a data storage disk 40, for example, a hard drive or other type of data storage, is enhanced to comprise its own file system 45 which is operable to require the operating system to issue a command (e.g. a Unix "ls" command) to receive a listing of file names and metadata for a given directory of the disk 40 and enables a file or directory owner user to control whether the operating system will be permitted to read or write to a file or directory of the storage disk 40. The file system 45 enables a file or directory owner/user to control whether a file or directory of the storage disk 40 is provided read and/or write protection in relation to the operating system by the user setting or asserting a desired protection for the file or directory (e.g. whether OS read/write operations are generally permitted or need explicit permission by the user). Where a file or directory of the storage disk 40 has been set for protection, and then the operating system of a computer comprising the apparatus of the present invention tries to perform a particular file or directory operation that the file system 45 is set to protect against, an alert and request is made to the user via the independent keyboard 65 and display 60 via the independent connection 80. The apparatus of the present invention will allow such operation to proceed only if/when the user grants explicit permission via a keyboard 65 input. During the time period the user grants such explicit permission the keyboard 65 is placed in a secure mode whereby it is disconnected from the CPU 10 and operating system and, later, after such permission has been granted (or refused), the keyboard 65 is reconnected to the CPU 10 in a regular mode.

The data storage disk 40 (e.g. hard drive) is enhanced to include file system software in fixed memory so that it is unreachable by the CPU 10 and a micro-controller, which is also unreachable by the CPU 10, to run (execute) the file system software. The file system software and microcontroller are operable to require that all or some (i.e. in a more relaxed embodiment) data storage disk 40 operations be performed by or via the independent file system 45. In a relaxed embodiment, for example, the hard drive 40 may be partitioned into two parts. A first part where the CPU 10 and its OS have unfettered operability in relation to the data (information) of storage disk 40 (e.g. hard drive) according to the conventional computer systems described above, so as to allow maximal performance in running conventional operating system files operations. A second part comprises user files which can only be accessed only through the independent file system 45 via the described controlled operations.

Optionally, the independent connection 80 also extends to a monitor or display 30 which includes its own display drivers 35, independent from the CPU 10 and its operating system, to communicate data between the independent file system 45 and the monitor 30—again gated by the independent keyboard and display 65. The monitor's display drivers 35 operate to perform a number of display driver functions which include directly rendering on the monitor's display such file formats as JPEG MPEG and Portable Network Graphics (PNG) for example. This functionality enables a user to view a user data file on the monitor 30 (e.g. a highly private or confidential picture) without having the file accessed by the CPU 10 where malware might be running, so as to avoid theft of the file by such malware. Depending on the independent drivers 35 of the monitor 30, or how the authoring program has rendered the underlying information of the data file, the monitor 30 can independently render quite arbitrary information such as financial projections, key intellectual property, etc., without risk of CPU resident malware being able to copy it and transfer it back to the malware perpetrator.

The independent connection 80, the disk file system 45 comprising software and micro-controller independently operable from the CPU 10 as described, and the keyboard 65 together operate to enable a user to set or assert read and/or write permission settings for files in the disk 40 via metadata of the file system 45. The settings indicate whether the user needs to explicitly give read and/or write permission to the operating system (i.e. the CPU's OS) to perform the corresponding action on a specific file or directory each and every time the file or directory is actioned. Such user-set or asserted files in the disk 40 will be protected against overwriting or breach of privacy by malware control of the CPU and operating system. Depending upon the particular application, it may be sufficient for the user to use the independent display 60 of the keyboard 65 to select the file(s) to be set or asserted in this manner. However, this will require the user to browse the files on the file system through the limited keyboard display 60.

Alternatively, for applications involving storage disks 40 containing large numbers of files, the file system will allow the CPU 10 to access the disk's 40 file listings and file metadata and present to the user on the monitor 30 a conventional view of the file system as per the norm. However, a designated user-action (e.g. right-clicking on a file, or other equivalent action) operates to cause the operating system to offer the user an option to protect the file (i.e. against overwriting or breach of privacy). Once a user selects a file for this option, the operating system issues a command to the file system 45 to set the file for protection and, instead of completing this command automatically as a conventional computer system would, the file system 45 instead activates the independent connection 80 to the keyboard 60 and display 65 to present a confirmation dialog directly to the user, bypassing the CPU 10, to obtain the user's confirmation that the selected file permission should be set. If the user accepts this confirmation, the file system 45 independently completes the setting of the user-selected file (or directory). This confirmation dialog serves to authenticate the user's file selection because, absent such direct dialog with the user, resident malware could fake the whole process (i.e. to the appearance of the user) without actually setting or asserting any file for protection. The confirmation dialog lets the user know the file is actually protected because at that point the user's information and commands operate independently of the CPU 10 and any malware running atop it.

Files that are protected before a malware infection happens will be protected as described because they are set or asserted for protection before any malware tampering may occur. For an unprotected file that is operated on after a malware infection has occurred, this protection will depend on where the file comes from. If it comes from another user on a USB device or over a network, then it may come with associated "protected setting/assertion" metadata in which case it will be protected automatically once resident on disk. Alternatively, if a certain file folder is given "protection set/asserted" status, then any file that gets placed into that folder will automatically get that protection. More generally, a user is able to designate that all files within a whole partition of the disk 40 get automatic protection status. If, however, a user were to operate on a file (e.g. a PowerPoint file) using a CPU resident application (such an operation to author the file) during a time of malware infection, to cause the file information (data) to be moved into the CPU and OS part of the system and, thus, give malware access to it, the present invention will not be able to fully protect that file. In such circumstances, the malware would be able to copy the information, but would not be able to destroy any successfully protected versions of the authored information.

Once a file of the disk 40 has been so set or asserted by the file system 45, the file system 45 will again activate the independent connection 80 to the keyboard 65 and display 60 to first obtain the user's confirmation of any command to access the file (whether to overwrite or read the file) before it will act on such a command from the CPU 10. This file access confirmation requirement, direct from the user via the keyboard 65 and display 60, prevents any resident malware from silently overwriting or reading a file that has been set or asserted for protection, because the user would be alerted to such action by a confirmation request that, to the user, would seem to arise for no reason (or, more typically, to repeated such requests where malware attempts to access and/or overwrite numerous files).

Further, using the direct file rendering functions of the display drivers, the computer's operating system may allow a user to see an index for the file system and to request a direct connection for transferring a set or asserted (i.e. overwrite or privacy protected file) to be displayed directly from the disk 40 on the monitor 30 via the display drivers 35. Similar to the above-described action prompted by the CPU 10, when faced with such a request in which the CPU 10 has participated, the disk 40 and file system 45 will present a confirmation dialog to the user via the independent keyboard 65 and display 60 requiring that the user confirm the file transfer and, absent such user confirmation, the file system 45 prevents any transfer of the file. This results in a secure transfer of an appropriately formatted (i.e. format which the display drivers 35 can render), user-set or asserted file in storage disk 40 directly to the monitor 30, without going through the CPU 10 or RAM 20 used by it and, thus, without allowing such file to fall within reach of any malware running on the CPU 10.

In similar manner, the independent connection 80 may, optionally, extend to other devices such as speakers (not illustrated in FIG. 2), having their own (independent) audio drivers (e.g. to play MP3 files) to allow a rendering of user-set protected audio files in storage disk 40 independently of the CPU 10 and its operating system.

Optionally, the independent secure disk 40 and file system 45 include encryption and decryption operational functions. The encryption/decryption function enables a user to maintain/place another user's encryption key within the file system 45 in order to make an encrypted copy of a user-selected file for that other user. The secure file system 45 performs the encryption independently of the CPU 10 and the operating system and the encrypted file can be sent to the other user either over a network or via a CD, USB or other drive. This enables the other user to put the encrypted file into his own like computer with a secure file system where it can be decrypted, using his own decryption key, independently of that computer's CPU and its operating system and, thereafter, used by the receiving user as desired. In this way, private information can be transferred between computers without the information falling into the reaches of malware running on either or both computers' CPUs.

Figure 3:
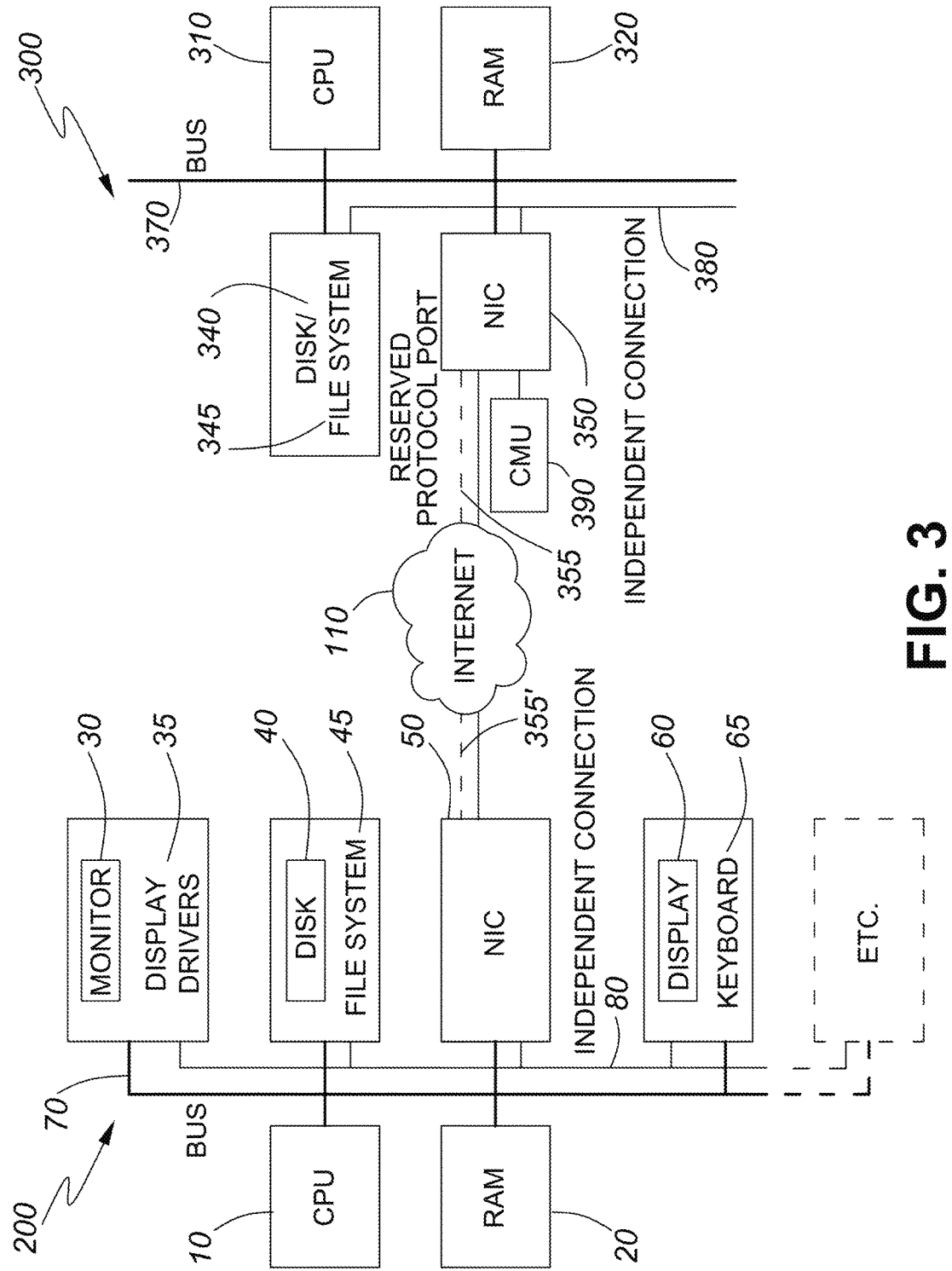
FIG. 3 is a block diagram showing the modified computer of FIG. 2 connected to a remote server in a data communications/Internet network wherein the remote server has also been modified in accordance with a further aspect of the invention.

As illustrated by FIG. 3, the apparatus of the present invention for enhancing a computer described in the foregoing, may further modify the computer for secure usage in a network environment to connect to a remote server which is also modified over a conventional server in accordance with a further aspect of the invention.

For a networked embodiment of the invention as illustrated by FIG. 3, the independent connection capability of the embodiment of FIG. 2 is extended to each of the NICs 50, 350 of the networked computer 200 and the remote server 300. Each NIC 50, 350 is configured to ensure that certain transactions are carried over a reserved protocol port 355, 355' (e.g. protocol port zero) that is inaccessible to the CPUs 10, 310 and their operating systems (the NICs would silently erase all packets sent by the CPU using protocol port zero and never deliver a packet with protocol port zero to a CPU). Any/all transactions using the reserved protocol port are presented to the user on the independent keyboard display 60 for the user to confirm in the same manner as described above. This enables the keyboard 65 and display 60 of a local computer 200 to be securely connected to a remote server 300 to provide access to an authorized file on a storage disk 340 of the remote server 300, having a file system 345, and display it on the monitor 30 of the computer 200, thereby enabling an authorized user-requested overwrite of remote files on the server 300, as well as to remotely access privacy protected files on the server 300 and independently render them on the monitor 30 (or speaker, etc). The server advantageously includes a credentials memory unit (CMU) 390 that is directly connected to the server's NIC 350 and inaccessible to the server CPU 310. As described in the applicant's CA patent no. 2,650,163 issued 23 Jul. 2013 the user is authenticated by the NIC 350 by requiring the user, via the independent keyboard 65 and display 60, to provide the right login sequence (i.e. the user's credentials stored in the CMU) over the reserved protocol port 355' of the computer's NIC 50 to the reserved protocol port 355 of the server's NIC 350. This provides a user authentication process which is beyond the reach of any malware running on the user's CPU 10 and, in turn, enables an enterprise server to allow remote users to view files in storage disk(s) 340 in the enterprise network without the risk of a user's computer's resident malware gaining access to those files. In essence, the keyboard-display 60, 65, NIC 50 and monitor-display drivers 30, 35, connected independently via connection 80 and reserved protocol ports 355, 355', act much like a TV set for the user's viewing of the files, without any participation by the CPU 10.

Advantageously, this network embodiment also protects the computer 200 against resident malware from making fraudulent updates to programs and operating system files of the computer 200. It is common for computer programs and operating systems to self-initiate updates, over the Internet network, for purposes of bug-fixes etc. and a conventional computer provides no way an ordinary user can supervise and control this process to thwart malware from making changes. The invention newly allows this by enabling the user to set or assert programs and operating system files, as desired, for overwrite protection, and obtain supervisory control over any updates to those files as described in the foregoing. The file system 45 of the storage disk 40 containing the set or asserted program/operating system files may be configured to present a series of proposed updates (likely batch) and provide to the user, by an independent operation shown on the monitor 30 or the keyboard display 60, a cryptographic hash summarizing the proposed updates. The user can then check that hash independently, without going through the CPU 10, with what the computer communicates to be the server's offer, and allow the user to confirm a valid install. Thus the user can confirm that the right updates are happening from the right network server.

Figure 4:
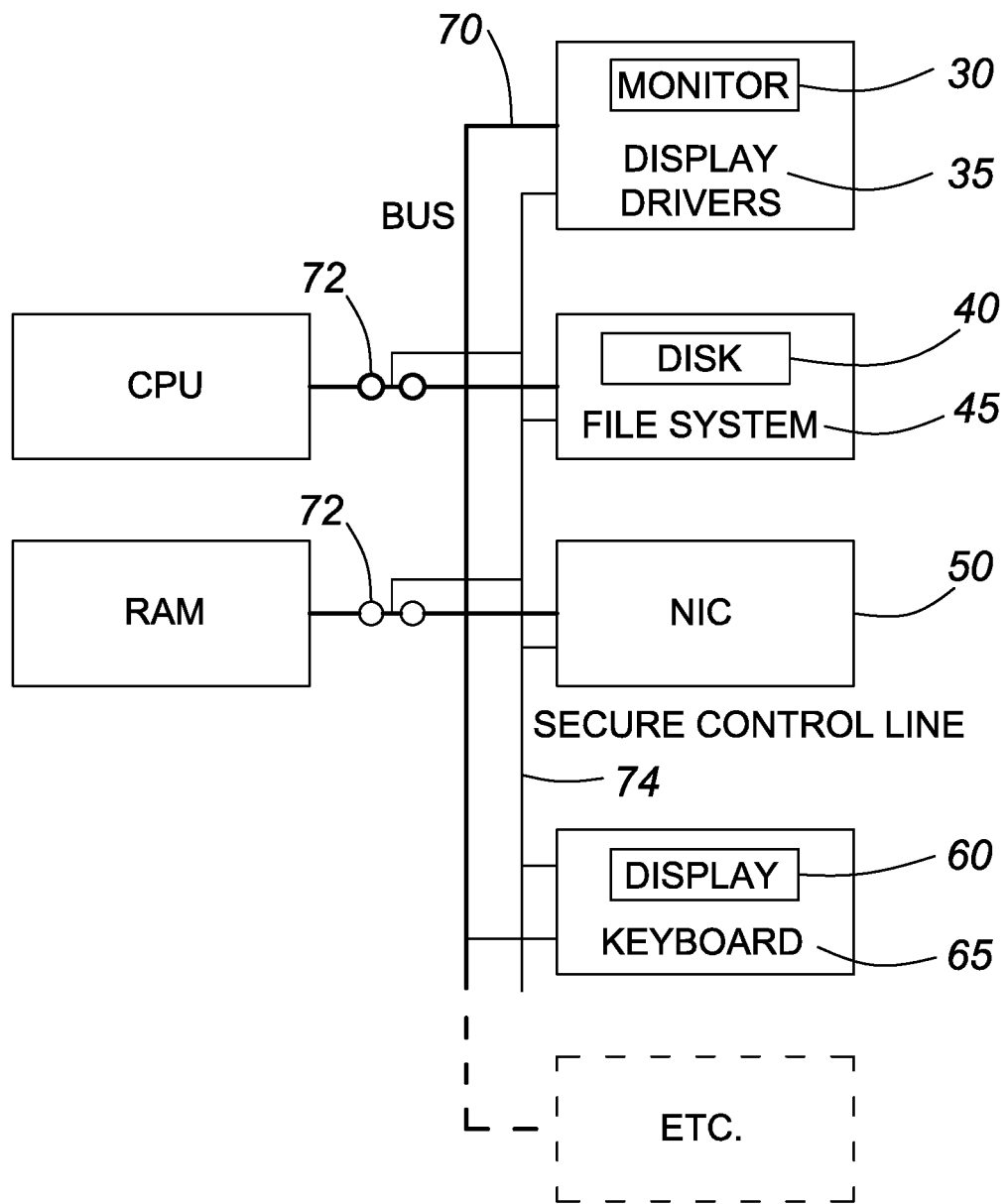
FIG. 4 is a block diagram showing the components of a modified computer which, though similar to FIG. 2, has a connectivity which varies from that of FIG. 2 in accordance with a further aspect of the invention.

The computer embodiment of FIG. 2 uses an independent connection 80 to obtain secure communication of file data between a storage disk 40 and a monitor 30 and keyboard 65. However, alternate means of obtaining such an independent (secure) communication of file data, without any visibility of the CPU, are possible and included within the scope of the present invention. For example, FIG. 4 illustrates an alternate embodiment which uses a different configuration for this connectivity. Specifically, in the alternative embodiment of FIG. 4, the central bus 70 is itself augmented with a control line 74 that signals when a secure file data transfer is requested or initiated and, only when the control line 74 is activated, is such data made available on the bus 70 for secure transfer. At the same time, such activation of the control line 74 drives disabling switches 72 that cut off connectivity of the secure data on the bus 70 to the CPU 10 and RAM 20 whereby they are prevented from access to any data on the bus 70 while it operates in such secure mode. To do so it is not necessary to completely disable the CPU 10 and RAM 20 while a secure operation takes place and, instead, the control line 74 may be configured to operate during only a fraction of clock cycles (e.g. 1 out of 4), such that the CPU 10 and RAM 20 are able to operate most of the time in a normal (non-secure) mode while the independent (secure) data operations proceed during designated time intervals without CPU visibility. In some instances, it may be desired for some RAM 20 to be made available to facilitate secure mode data transfer. In such a case, the RAM 20 is made available only while the secure control line 74 is activated, during which time it is not accessible to the CPU 10.

Figure 5:
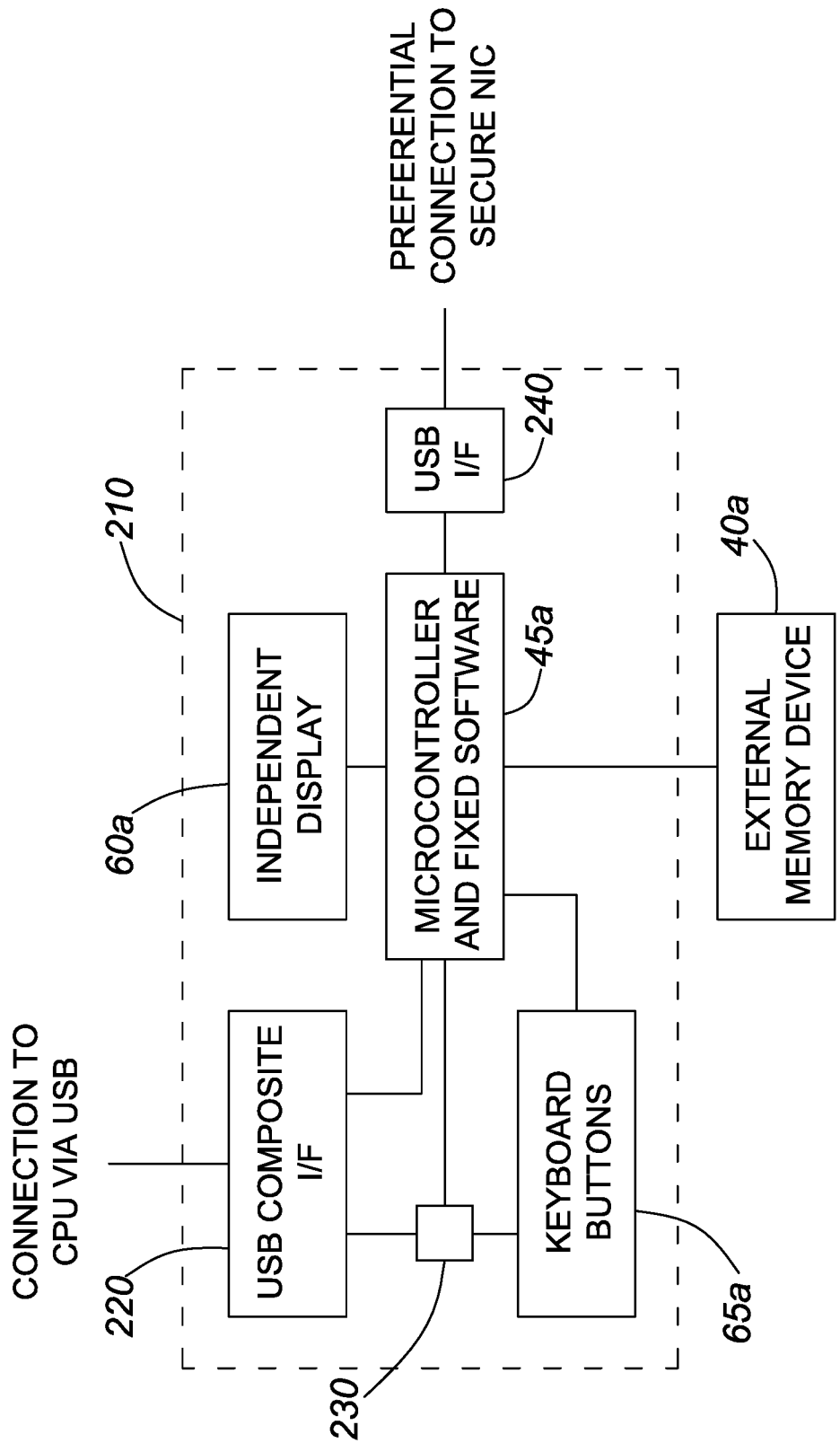
FIG. 5 is a block diagram of an alternative embodiment of the invention for which modifications to computer architecture are limited to peripheral components, this embodiment showing a keyboard configured to provide protection to external data drives connectable to a port (or ports) of the keyboard.

An alternative embodiment to that of FIG. 2 is illustrated by FIG. 5. For this embodiment, the required changes to computer architecture are limited to peripheral components of a computer system viz. to the keyboard unit 210 in this embodiment, compared to the modifications to the hard drive 40 of FIG. 2. Advantageously, this embodiment allows file protection to be enabled for an external data drive 40a, such as USB memory sticks and SD cards, which are connectable to the keyboard unit 210. As illustrated, when a USB memory stick or an SD card (i.e. external memory device 40a) is connected to the keyboard unit 210, it will not be transparently connected through to the computer's CPU via the interface connector 220 but, rather, will be controlled by a microcontroller and embedded software operating as a file system 45a. The file system 45a is unreachable by the computer's CPU and operative to perform the above-described independent file system functions for the attached external data drive 40a. The keyboard unit 210 connects to the computer, and CPU and operating system of the computer, via a USB composite interface 220. Therefore, the keyboard unit 210 will appear to the CPU as a composite USB device comprising a regular keyboard 65a (i.e. keyboard buttons) and a data drive 40a connected to the keyboard unit 210. Alternatively, the keyboard unit 210 could be configured to simulate a USB hub to which both a regular keyboard and data drive are connected via a high-speed USB connection suitable for transferring files.

The keyboard unit 210 includes a switch 230 which switches from secure mode to regular mode as described above, depending upon whether a requested operation concerns a file that has been given "protection set/asserted" status and to allow the user to grant (or not) explicit permission via a keyboard 65a input. As described above, during the time period the user grants such explicit permission the switch 230 operates in secure mode to disconnect the keyboard 65a from the computer's CPU and operating system, and is then after such permission has been granted (or not) returns to regular mode operations for which the keyboard 65a is reconnected. A display 60a of (or connectable to) the keyboard unit 210 operates independently of the computer's CPU, in combination with the keyboard 65a, as described above with respect to display 60 and keyboard 65. In addition, the keyboard unit 210 includes a receptacle configured to accept i.e. to interface with and connect to, the external data drive 40a (e.g. a USB memory stick or an SD card). The keyboard unit 201 may also include an independent connection 240 to a network interface card (NIC) to enable independent transactions directly to network servers as described above.

Figure 6:
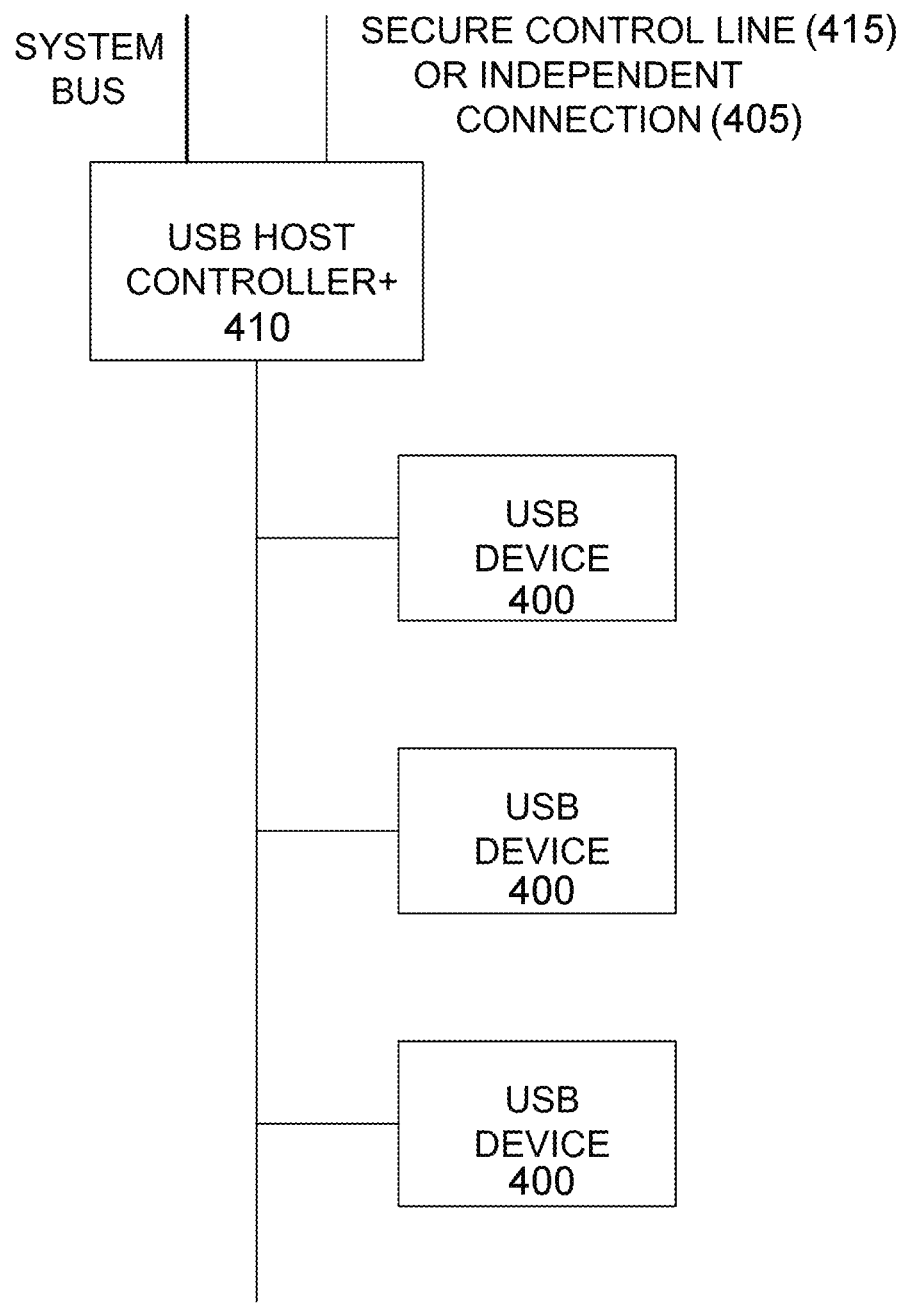
FIG. 6 is a block diagram illustration of means for securely connecting one or more USB devices to a computer in accordance with a further aspect of the invention.

A further aspect of the invention extends the computer protection of FIGS. 2, 3 and 4 to more general USB devices connected to the computer, as illustrated by FIG. 6. A USB host controller 410 is configured to discover and define secure endpoints within USB devices 400 connected to the USB host controller 410 via a connection 405, in addition to the convention functions of such a device. With such endpoints identified, the USB host controller then controls data to/from the USB devices 400 to allow only a direct transfer of the data between those secure endpoints of the USB device 400 to the keyboard 65 and display 60 or monitor 30, via a secure control line 415 of the USB system that is connected to an independent connection 80 (FIG. 2) or control line secured bus 70 (FIG. 4). As described above with reference to FIGS. 2 and 4 for data transfer from a storage disk 40, the CPU 10 is, therefore, prevented from having access to that data. USB devices have an ability to contain descriptive information for self-identification to computers and a single USB device can contain multiple endpoints that are independently addressable by a USB host controller. It is this ability which is used to configure the USB host controller 410 to define the secure end points.

Referring to the computer 200 of FIG. 2 having a secure keyboard 65 and display 60 and the USB system of FIG. 6, the USB host controller 410 is configured for secure operation of the USB devices 400 with the computer 200 by defining conventional endpoint(s) for normal mode interaction with the CPU 10 and its operating system and secure endpoints for a secure provision of keyboard 65 keystrokes, secure display of information via display 60 or monitor 30 and secure mode interaction to other functions and devices independent of the CPU 10.

As will be recognized by persons skilled in the art, many other combinations of and alternatives to the describe elements and materials may be functionally equivalent and yield similar results, and all such equivalents are within the scope of this invention. The present invention is not limited to any particular embodiment(s) disclosed herein. It is to be understood that various changes and modifications can be made to achieve the invention without departing from the scope thereof, which is defined by the appended claims.

What is claimed is:

1. Apparatus for use with a host computer having a central processing unit operated by an operating system and a central bus connecting the central processing unit to computer system components including peripheral components, for securing data of a data storage component connected to the central bus against malware resident in the central processing unit, the apparatus comprising:
   (i) a keyboard including or connectable to a display, wherein the keyboard is configured for connection to the central bus; and,
   (ii) a secure connection for communicating data between the data storage component and the keyboard wherein the secure connection is operable independently of the central processing unit;

wherein a file system is configured to manage data files of the data storage component independently of the central processing unit and to allow access, display and transfer of the data files independently of the central processing unit; the keyboard is configured for displaying on the display the data files communicated from the data storage component independently of the central processing unit; and, the keyboard, data storage component and secure connection are together operable to enable a user to set or assert data of the data storage component for protection and to prevent the central processing unit from accessing the set or asserted data by requiring the user to confirm any access to the set or asserted data by the central processing unit.

2. The apparatus according to claim 1 wherein the data storage component is a disk drive comprising the file system and the file system comprises file system software in fixed memory and a micro-controller configured to execute the file system software.

3. The apparatus according to claim 1 wherein the keyboard and the file system are provided by a keyboard unit connectable, as a peripheral component, to the host computer and the central bus, and the data storage component is an external memory device connectable to the keyboard unit, wherein the file system comprises file system software in fixed memory and a micro-controller configured to execute the file system software.

4. The apparatus according to claim 1 and further comprising a monitor connectable to the central bus and comprising display drivers operative for rendering directly on the monitor, independently of the central processing unit, the data files of the data storage component, wherein the keyboard, data storage device and secure connection are together operable to enable a user to select the set or asserted data for display on the monitor independently of the central processing unit, and to display the set or asserted data on the monitor independently of the central processing unit by requiring the user to confirm a transfer of the set or asserted data to the monitor for display.

5. The apparatus according to claim 1 wherein the secure connection comprises an independent connection between the keyboard and the data storage component, the independent connection being physically separate from the central bus.

6. The apparatus according to claim 1 wherein the secure connection comprises a control line of the central bus which is operative in a secure mode to control switches for disabling the central bus from communicating data from the data storage component and/or the keyboard to the central processing unit.

7. The apparatus according to claim 4 wherein the secure connection comprises an independent connection between the keyboard, the data storage component and the monitor, the independent connection being physically separate from the central bus.

8. The apparatus according to claim 4 wherein the secure connection comprises a control line of the central bus which is operative in a secure mode to control switches for disabling the central bus from communicating data from the data storage component and/or the monitor and/or keyboard to the central processing unit.

9. The apparatus according to claim 1 and further comprising a network interface card (NIC) connectable to the central bus for network communications between the host computer and a remote computer configured for secure transfer of data to a user of the host computer independent of the host computer's central processing unit, wherein the network interface card includes a reserved protocol port for communicating data with the secure connection, the remote computer comprising a remote central processing unit, a remote data storage device connected to the remote central processing unit by a remote central bus, a remote network interface card (NIC) connected to the remote central processing unit and configured to obtain and authenticate credentials information from a user of the host computer, a credentials memory unit connected to the remote NIC for storing user credential information used by the NIC to authenticate users of the host computer for communicating with the remote computer, and a remote secure connection for communicating data between the remote storage device and a reserved protocol port of the remote NIC, wherein the remote data storage device, remote NIC and remote secure connection together are operative to enable an authenticated user of the remote computer to request data of the remote storage device and to transfer the requested data from the remote storage device via the remote secure connection to the reserved protocol port of the host computer's NIC via the reserved protocol port of the remote computer's NIC.

10. The apparatus according to claim 1 and further comprising a USB (Universal Serial Bus) system wherein the USB system comprises a USB host controller connected to the central bus and the secure connection of the host computer, and at least one USB data storage device connected to the USB host controller, wherein the USB host controller is configured to define endpoints of the USB data storage device, the USB data storage device comprising protected data between the defined endpoints, the USB host controller controlling transfer of the protected data between the defined endpoints to the secure connection of the host computer.

11. A method for securing data of a data storage device of a host computer against malware resident in a central processing unit of the host computer, the method comprising:
(a) communicating data via a secure connection between the data storage device and a user interface device wherein the secure connection operates independently of the central processing unit, the user interface device including or connectable to a display;
(b) managing data of the data storage device independently of the central processing unit through use of a file system configured to allow access, display and transfer of data files of the data storage system independently of the central processing unit;
(c) displaying on the user interface device the data files communicated from the data storage device independently of the central processing unit; and,
(d) operating the user interface device, the data storage device and the secure connection for: (i) enabling a user to set or assert data of the data storage device for protection; and, (ii) for preventing the central processing unit from accessing the set or asserted data by requiring the user to confirm via the user interface device any access to the set or asserted data by the central processing unit.

12. The method according to claim 11 and further comprising rendering the data files of the data storage device directly on a monitor of the host computer independently of the central processing unit; and operating the user interface device, data storage device and secure connection for: (i) enabling a user to select the set or asserted data for display on the monitor independently of the central processing unit; and, (ii) displaying the set or asserted data on the monitor independently of the central processing unit by requiring the user to confirm a transfer of the set or asserted data to the monitor for display.

13. The method according to claim 11 or 12 wherein the secure connection comprises an independent connection between the user interface device and the data storage device, wherein the independent connection is physically separate from a central bus of the host computer.

14. The method according to claim 11 or 12 wherein the secure connection comprises a control line of a central bus of the host computer which is operative in a secure mode to control switches for disabling the central bus from communicating data from the data storage device and/or the user interface device to the central processing unit.

15. The method according to claim 11 and further comprising communicating data between a network interface card (NIC) of the host computer and a remote network interface card (NIC) of the remote computer, wherein the remote computer is configured for secure transfer of data to a user of the host computer independent of the host computer's central processing unit and for obtaining and authenticating credentials information from the user; communicating data via a reserved protocol port of the network interface card to the secure connection; communicating data a via a remote secure connection between a remote storage device of the remote computer and a reserved protocol port of the remote NIC; operating the remote data storage device, remote NIC and remote secure connection for enabling an authenticated user of the remote computer to request data of the remote storage device and for transferring the requested data from the remote storage device via the remote secure connection to the reserved protocol port of the host computer's NIC via the reserved protocol port of the remote computer's NIC.

16. The method according to claim 11 and further comprising defining endpoints of a USB (Universal Serial Bus) data storage device connected to a central bus of the host computer wherein the USB data storage device comprises protected data between the defined endpoints; and, controlling transfer of the protected data between the defined endpoints to the secure connection of the host computer.

* * * * *